(12) United States Patent
Diatzikis et al.

(10) Patent No.: US 8,820,167 B2
(45) Date of Patent: Sep. 2, 2014

(54) VIBRATION SENSOR

(75) Inventors: Evangelos V. Diatzikis, Chuluota, FL (US); Michael Twerdochlib, Oviedo, FL (US); Luis Alberto de Almeida Ferreira, Vila Nova de Gaia (PT); Francisco Manuel Moita Araújo, Matosinhos (PT)

(73) Assignee: Siemens Energy, Inc., Orlando, FL (US)

( * ) Notice: Subject to any disclaimer, the term of this patent is extended or adjusted under 35 U.S.C. 154(b) by 728 days.

(21) Appl. No.: 13/024,501

(22) Filed: Feb. 10, 2011

(65) Prior Publication Data

US 2012/0204651 A1 Aug. 16, 2012

(51) Int. Cl.
*G01H 9/00* (2006.01)

(52) U.S. Cl.
CPC .................................. *G01H 9/004* (2013.01)
USPC ........ 73/653; 73/655; 73/514.26; 250/227.18

(58) Field of Classification Search
USPC ......... 73/643, 514.26, 214.27, 653, 657, 655; 250/227.14, 227.18, 231.1; 385/12, 13, 385/4, 5
See application file for complete search history.

(56) References Cited

U.S. PATENT DOCUMENTS

| | | | |
|---|---|---|---|
| 5,146,776 A | 9/1992 | Twerdochlib et al. | |
| 5,680,489 A | 10/1997 | Kersey | |
| 5,684,718 A | 11/1997 | Jenkins et al. | |
| 5,844,667 A * | 12/1998 | Maron | 356/35.5 |
| 5,892,860 A | 4/1999 | Maron et al. | |
| 6,175,108 B1 | 1/2001 | Jones et al. | |
| 6,636,041 B2 | 10/2003 | Arz et al. | |
| 6,721,470 B2 | 4/2004 | Bosselmann et al. | |
| 6,765,194 B2 | 7/2004 | Holz et al. | |
| 6,807,325 B1 | 10/2004 | Kraemmer et al. | |
| 7,326,917 B2 | 2/2008 | Diatzikis et al. | |
| 7,486,864 B2 | 2/2009 | Diatzikis | |
| 2005/0129088 A1 | 6/2005 | Rajendran et al. | |
| 2006/0132792 A1 | 6/2006 | Schultz et al. | |
| 2008/0036336 A1 | 2/2008 | Salem et al. | |
| 2008/0041162 A1 | 2/2008 | Twerdochlib | |
| 2008/0281209 A1 * | 11/2008 | Arkwright et al. | 600/478 |
| 2010/0066315 A1 | 3/2010 | Diatzikis et al. | |
| 2010/0313658 A1 | 12/2010 | Andersen et al. | |
| 2012/0209545 A1 * | 8/2012 | Humphries et al. | 702/56 |

FOREIGN PATENT DOCUMENTS

WO 2010136723 A1 9/2010

* cited by examiner

*Primary Examiner* — Peter Macchiarolo
*Assistant Examiner* — Rose M Miller

(57) ABSTRACT

A sensor includes a housing adapted to be secured to a component within a system to be monitored by the sensor, an optical fiber, and a membrane spring assembly. The optical fiber includes a sensing portion containing a fiber Bragg grating that is able to undergo expansion and contraction resulting from movement of the optical fiber at a second location relative to a first location. The membrane spring assembly includes a membrane disc, wherein movement of a central portion thereof causes corresponding displacement of the optical fiber at the second location to cause expansion and contraction of the sensing portion of the optical fiber containing the fiber Bragg grating, which expansion and contraction effects a change in a light wavelength reflected by the fiber Bragg grating. The light wavelength reflected by the fiber Bragg grating can be used to measure movement of the central portion of the membrane disc.

21 Claims, 8 Drawing Sheets

VIBRATION SENSOR

FIELD OF THE INVENTION

The present invention relates to a vibration sensor, and more particularly, to a vibration sensor including an optical fiber containing a fiber Bragg grating.

BACKGROUND OF THE INVENTION

An electrical generator used in the field of electrical power generation includes a stator winding having a large number of conductors or stator bars that are pressed into slots in a base body, in particular, a laminated stator core or a rotor body. Such an electrical generator represents a very expensive and long-term investment. Its failure not only endangers the power equipment itself but may also result in very severe service reduction due to the down time associated with repair.

To avoid such a condition, diagnostic systems have been developed for early identification of defects. Due to the very high voltages within the generator, diagnostic systems for generators typically use sensor technology that avoids electrically conducting wires that could cause arcing to ground if they are deployed on a structure that is at a high voltage. For example, sensing signals within generators have been conveyed by optical conductors, such as by glass fibers.

SUMMARY OF THE INVENTION

In accordance with a first aspect of the present invention, a sensor is provided comprising a housing, an optical fiber, and a membrane spring assembly. The housing is adapted to be secured to a component within a system to be monitored by the sensor. The optical fiber is secured within the housing at a first location that is fixed relative to the housing and at a second location that is movable relative to the housing such that a sensing portion of the optical fiber between the first and second locations is able to undergo expansion and contraction resulting from movement of the optical fiber at the second location relative to the first location. The sensing portion of the optical fiber contains a fiber Bragg grating. The membrane spring assembly is located in the housing and comprises a membrane disc having a fixed portion that is fixed relative to the housing and a central portion that is movable relative to the housing. The central portion is fixed relative to the optical fiber at the second location such that movement of the central portion causes corresponding displacement of the optical fiber at the second location to cause expansion and contraction of the sensing portion of the optical fiber containing the fiber Bragg grating. The expansion and contraction of the sensing portion of the optical fiber effects a change in a light wavelength reflected by the fiber Bragg grating. The light wavelength reflected by the fiber Bragg grating can be used to measure movement of the central portion of the membrane disc.

In accordance with a second aspect of the present invention, a sensor system is provided comprising a sensor. The sensor comprises a housing, a membrane spring assembly, and an optical fiber. The housing is adapted to be secured to a component within a system to be monitored by the sensor system. The membrane spring assembly is located in the housing and comprises a membrane disc and first and second height discs. The membrane disc has a fixed portion that is fixed relative to the housing and a movable portion that is movable relative to the housing. The first and second height discs are located on opposing sides of the membrane disc and limit a maximum displacement flexure of the movable portion of the membrane disc. The optical fiber is located within the housing and comprises a first portion that is fixed relative to the housing, a second portion containing a fiber Bragg grating, and a third portion that is fixed relative to the movable portion of the membrane disc. The second portion of the optical fiber is located between the first and third portions thereof such that the second portion containing the fiber Bragg grating is able to undergo expansion and contraction resulting from movement of the movable portion of the membrane disc relative to the housing. The expansion and contraction of the second portion of the optical fiber effects a change in a light wavelength reflected by the fiber Bragg grating. The light wavelength reflected by the fiber Bragg grating can be used to measure movement of the movable portion of the membrane disc.

In accordance with a third aspect of the present invention, a sensor system is provided comprising a sensor. The sensor comprises a housing, a membrane spring assembly, and an optical fiber. The housing is adapted to be secured to a component within a system to be monitored by the sensor system. The membrane spring assembly is located in the housing and comprises a membrane disc and first and second membrane stoppers. The membrane disc has a fixed portion that is fixed relative to the housing and a movable portion that is movable relative to the housing. The first and second membrane stoppers are located on opposing sides of the membrane disc and limit a maximum displacement flexure of the movable portion of the membrane disc. The optical fiber is located within the housing and comprises a first portion that is fixed relative to the housing, a second portion containing a fiber Bragg grating, and a third portion that is fixed relative to the movable portion of the membrane disc. The second portion of the optical fiber is located between the first and third portions thereof such that the second portion containing the fiber Bragg grating is able to undergo expansion and contraction resulting from movement of the movable portion of the membrane disc relative to the housing. The expansion and contraction of the second portion of the optical fiber effects a change in a light wavelength reflected by the fiber Bragg grating. The light wavelength reflected by the fiber Bragg grating can be used to measure movement of the movable portion of the membrane disc.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
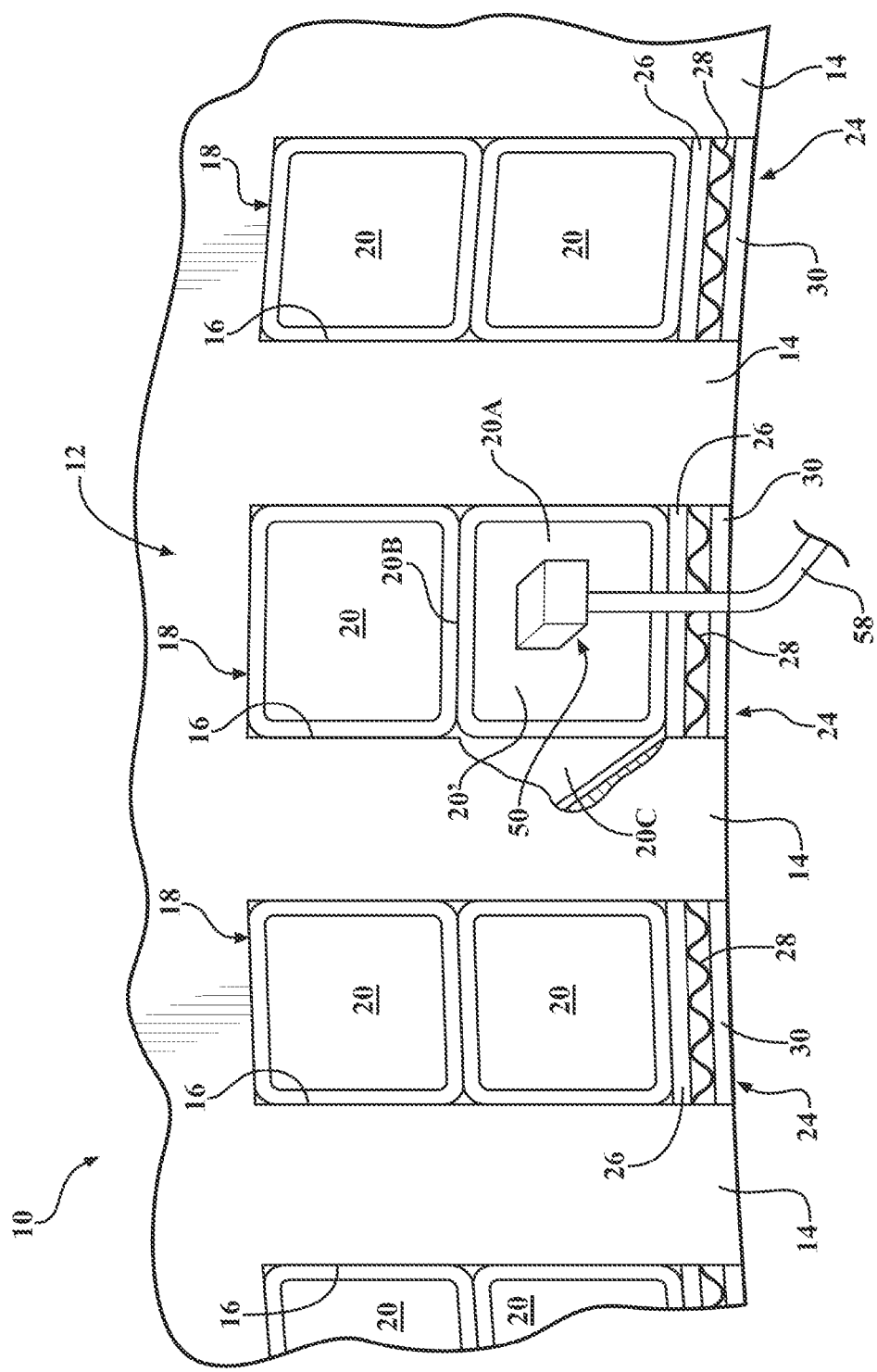
FIG. 1 is a perspective view illustrating a portion of a stator core of an electric generator provided with a vibration sensor in accordance with an embodiment of the invention.

Referring to FIG. 1, a portion of a stator 10 for an electric generator is illustrated and includes a stator core 12 comprising a plurality of stator teeth 14 defining radially extending slots 16. The stator core 12 comprises stator coils 18 including one or more stator bars 20 located in each slot 16. In the illustrated embodiment, a pair of stator bars 20 is located in stacked relation within each slot 16. The stator bars 20 may be wrapped in an insulation layer (not shown) forming a ground wall insulation.

The bars 20 may be retained in position by a retention structure 24 comprising one or more filler members, such as top slot fillers 26 and a top ripple spring 28 placed in the slot 16 radially inwardly from the inner one of the stator bars 20. The retention structure 24 may further comprise a wedge 30 installed in the slot 16, located radially inwardly from the top ripple spring 28, to compress the stator bars 20 in the slot 16 with a predetermined tightness and to substantially limit movement of the bars 20 relative to the stator core 12. While the position of the pair of stator bars 20 is substantially maintained by the retention structure 24, a certain degree of bending movement of the stator bars 20 still occurs in response to vibrations within the generator, causing stress in the material of the bars 20.

Figure 2:
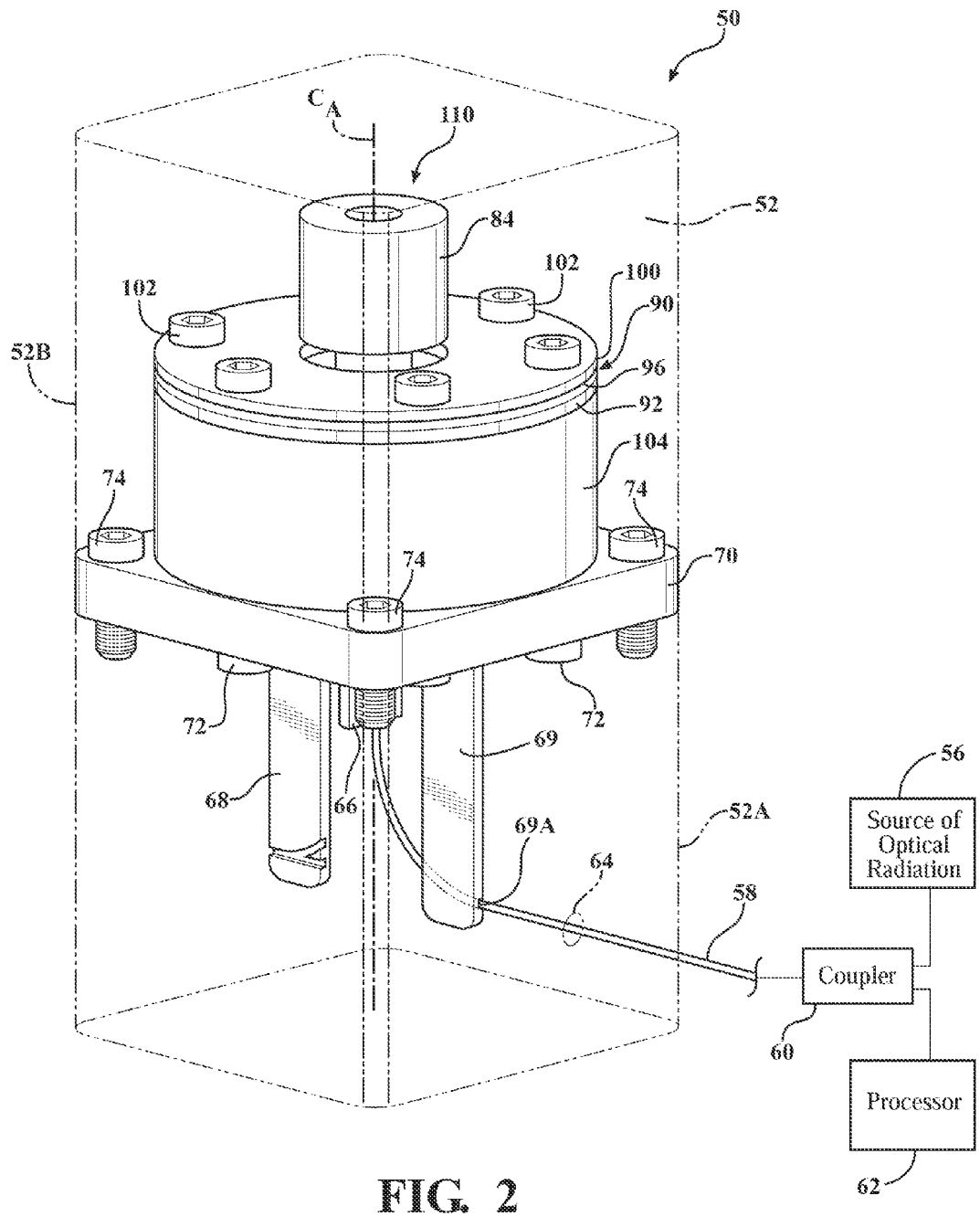
FIG. 2 is an enlarged perspective view of the internal components of the vibration sensor illustrated in FIG. 1.

Referring additionally to FIG. 2, a vibration sensor 50 according to an embodiment of the invention is mounted to a select one of the stator bars 20' and is illustrated in FIG. 1 as being mounted to an end portion 20A of the select stator bar 20'. It is noted that additional stator bars 20 of the stator core 12 may include additional vibration sensors 50. It is further noted that the vibration sensor 50 may be mounted to the select stator bar 20' at locations other than the end portion 20A thereof, such as a top portion 20B or a side portion 20C thereof (see FIG. 1).

In accordance with the present invention, vibrations of the select stator bar 20' and a condition of the vibration sensor 50, i.e., a structural condition, may be monitored via a signal provided by the vibration sensor 50. That is, the vibration sensor 50 provides a signal comprising sensor data, wherein the sensor data is monitored to determine vibrations of the select stator bar 20' and also to determine the condition of the vibration sensor 50 in accordance with an embodiment of the invention, as will be described herein. The signal provided by the vibration sensor 50 comprises a dynamic measurement signal of substantially cyclically varying value and is indicative of a stress level in the stator bar 20. In particular, the measurement signal may comprise a displacement signal that may be differentiated once to provide data on velocity and differentiated twice to provide data on acceleration of the end portion 20A of the select stator bar 20'.

Figure 3:
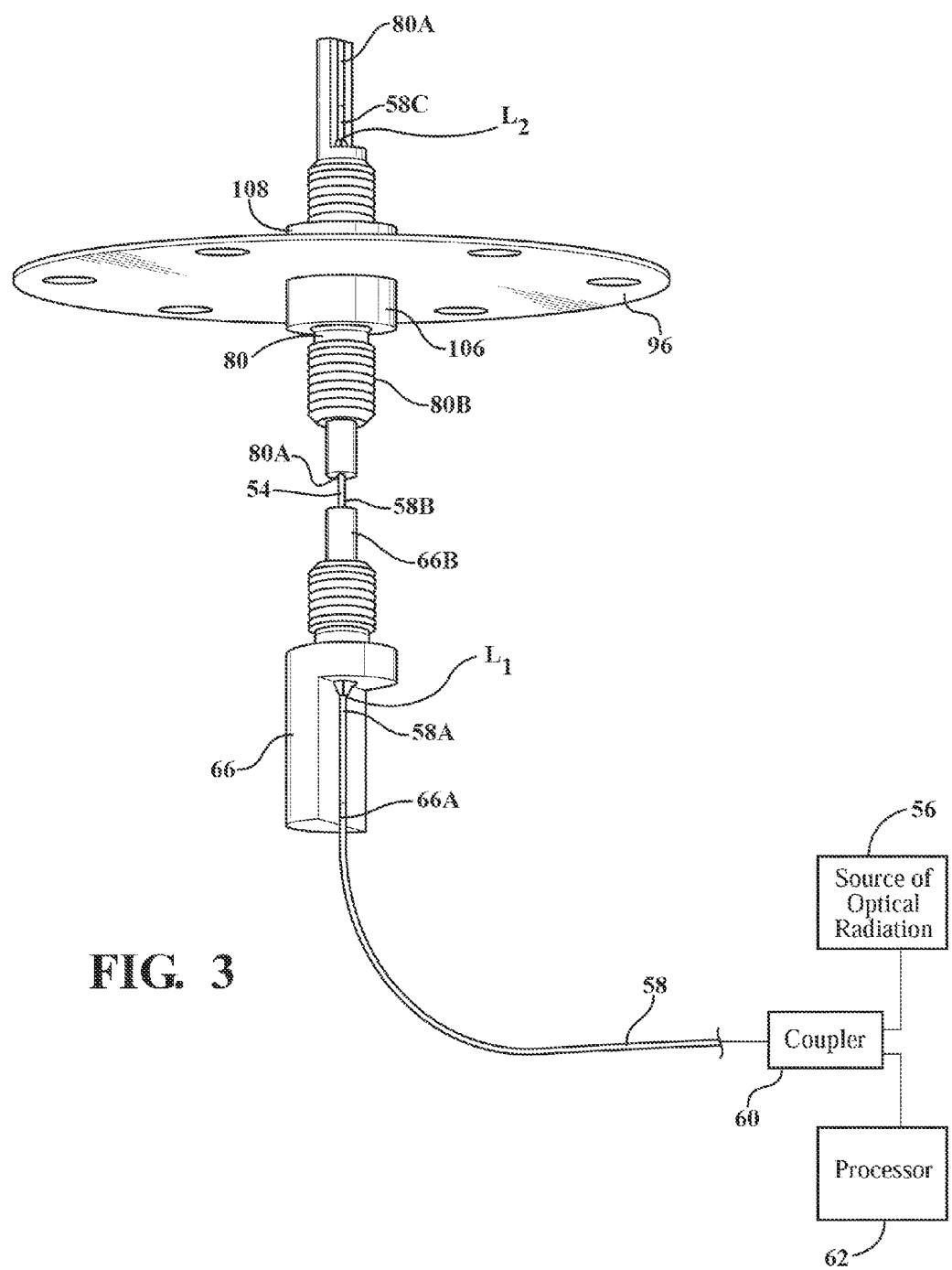
FIG. 3 is an enlarged perspective view of select components of the vibration sensor illustrated in FIG. 2.
Figure 4:
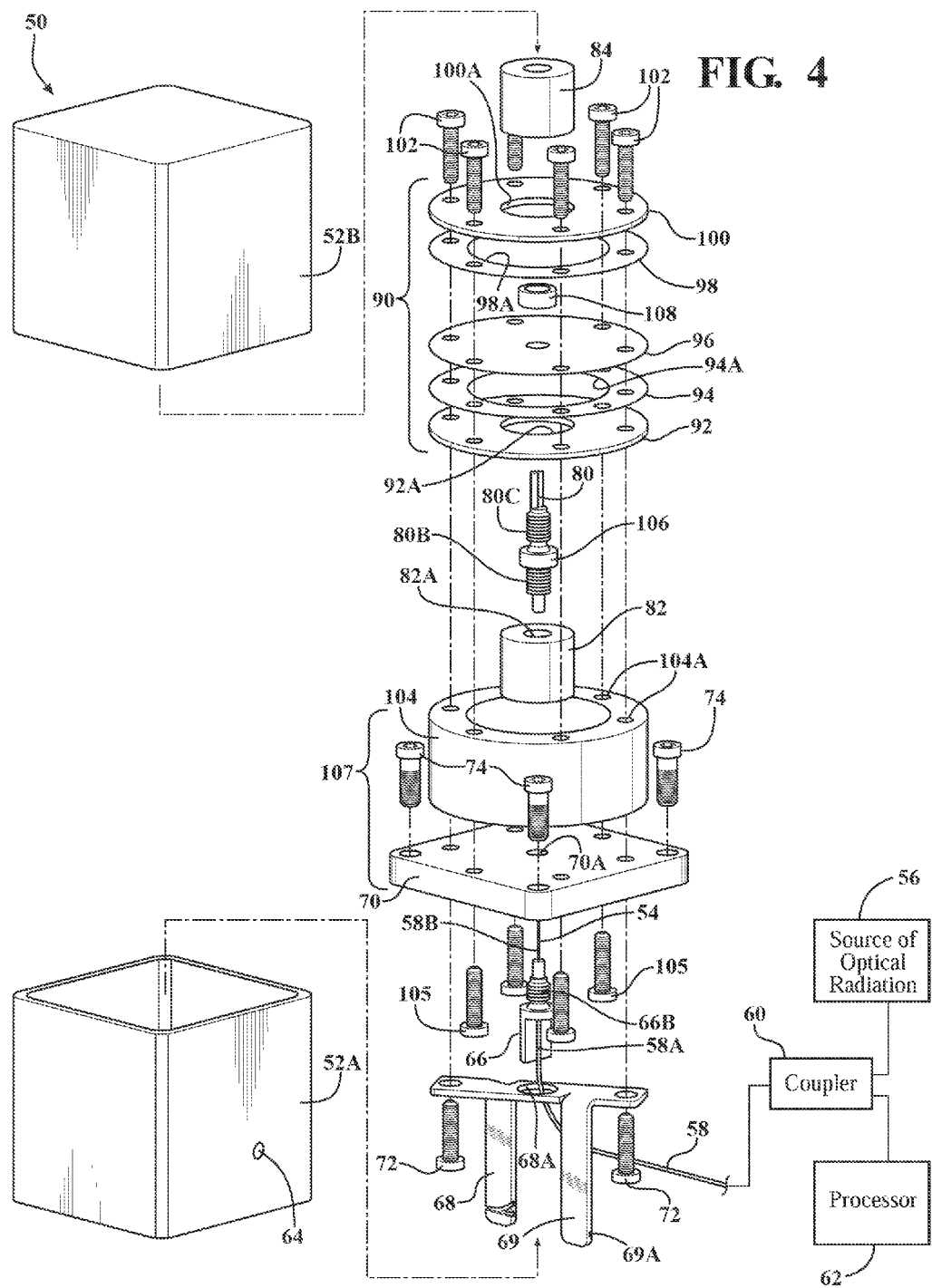
FIG. 4 is an exploded perspective view of the vibration sensor illustrated in FIG. 2.

Referring to FIGS. 2-4, the vibration sensor 50 comprises a housing 52 (FIGS. 2 and 4) that contains the internal components of the vibration sensor 50, which will be described herein. It is noted that only selected components of the vibration sensor 50 are illustrated in FIG. 3 so as to more clearly illustrate these selected components and to facilitate an effective description of their function.

The vibration sensor 50 includes a fiber optic sensor comprising a fiber optic Bragg grating (FBG) 54 defined by an index of refraction grating formed on a fiber optic conductor (FOC) 58, see FIGS. 3 and 4. The refraction gratings of the FBG 54 are formed at a predetermined spacing to reflect light passing through the FOC 58 at a predetermined wavelength comprising a grating-specific central Bragg wavelength $\lambda_O$. The FOC 58 comprises an elastically deformable material, such as an optical fiber used in conventional Bragg grating sensors and which may expand and contract in response to forces applied on either side of the FBG 54. As is described in greater detail below, the FOC 58 may be connected to a deflectable mass, which may be displaced relative to a frame that is also connected to the FOC 58. The displacement of the mass relative to the frame, corresponding to vibrations of the select stator bar 20', may cause a resulting cyclical elastic expansion and contraction of the FOC 58, such that a measured wavelength $\lambda$ of light reflected from the FBG 54 may vary cyclically about the central Bragg wavelength $\lambda_O$. The cyclical variation of the measured wavelength $\lambda$ of light reflected from the FBG 54 may be monitored and processed in a conventional manner to determine a condition of the generator in the region of the select stator bar 20'.

A source of optical radiation 56, such as a broadband light source, is coupled to the FOC 58 at a coupler 60 for providing the vibration sensor 50 with optical radiation, see FIGS. 2-4. The source of optical radiation 56 provides a predetermined range of light wavelength (or frequency) to correspond to the reflective response of the central Bragg wavelength $\lambda_O$ of the vibration sensor 50. Reflected light from the vibration sensor 50 is transmitted back through the FOC 58 and is received via the coupler 60 at a processor 62 or spectrum analyzer, as will be described herein.

Referring to FIG. 2, the FOC 58 enters the housing 52 through an aperture 64 formed in a wall of the housing 52. As shown in FIG. 3, a first portion 58A of the FOC 58 extends through a bore 66A formed through an anchor member 66 of the vibration sensor 50. The first portion 58A of the FOC 58 is secured to the anchor member 66 at a first location $L_1$ (see FIG. 3) within the bore 66A using a suitable affixation procedure, such as, for example, by adhesive bonding or cementing the first portion 58A of the FOC 58 to the anchor member 66 within the bore 66A. The anchor member 66 extends through an aperture 68A formed in an anchor plate structure 68 and is threadedly affixed to a core support 70, see FIG. 4. The anchor plate structure 68 is used to define a curvature of the FOC 58 between a groove 69A in a leg 69 of the anchor plate structure 68 and the anchor member 66 and to retain the first portion 58A of the FOC 58 in position. The anchor plate structure 68 is secured to the core support 70 via a plurality of bolts 72, and the core support 70 is coupled to a lower section 52A of the housing 52 via a plurality of bolts 74, see FIG. 2. The core support 70 structurally supports the anchor plate structure 68, the anchor member 66, and the first portion 58A of the FOC 58 at the first location $L_1$ within the lower section 52A of the housing 52, such that these components are fixed relative to the housing 52.

As shown in FIG. 4, a threaded end portion 66B of the anchor member 66 is threadedly received in a threaded opening 70A that is formed through the core support 70. The FOC 58 extends out of the bore 66A at the anchor member end portion 66B and is received in a bore 80A extending through a pointer member 80 (see FIG. 3), which pointer member 80 will be described herein. A second portion 58B of the FOC 58 extending between the anchor member 66 and the pointer member 80 is able to undergo expansion and contraction and comprises a sensing portion of the FOC 58 containing the FBG 54 described above.

As shown in FIG. 4, a threaded first end portion 80B of the pointer member 80 is threadedly engaged in a threaded hole 82A of a first mass 82 to support the first mass 82 thereon, and a threaded second end portion 80C of the pointer member 80 is threadedly engaged in a threaded hole 84A of a second mass 84 to support the second mass 84 thereon. Each of the first and second masses 82, 84 according to one embodiment of the invention weigh about 20-30 grams, although the masses 82, 84 could have other weights depending on the particular configuration of the vibration sensor 50 and the generator in which is it employed. Additional details in connection with the masses 82, 84 will be discussed herein.

A third portion 58C (see FIG. 3) of the FOC 58 is secured to the second end portion 80C of the pointer member 80 at a second location $L_2$ within the bore 80A using a suitable affixation procedure, such as, for example, by adhesive bonding or cementing the third portion 58C of the FOC 58 to the pointer member 80 within the bore 80A. As will be discussed herein, the third portion 58C of the FOC 58 at the second location $L_2$ is movable relative to the housing 52.

Referring to FIGS. 2-4, a membrane spring assembly 90 is associated with the pointer member 80. As most clearly shown in FIG. 4, the membrane spring assembly 90 comprises a first membrane stopper 92, a first height disc 94, a membrane disc 96, a second height disc 98, and a second membrane stopper 100. These components of the membrane spring assembly 90 are preferably formed from stainless steel and are coupled together via a plurality of bolts 102.

The bolts 102 engage threaded holes 104A of a spacer member 104 to couple the membrane spring assembly 90 to the spacer member 104 (see FIGS. 2 and 4), which spacer member 104 is coupled to the core support 70 via a plurality of bolts 105. The core support 70 and spacer member 104 define a mass-spring support structure 107 for effectively coupling an outer peripheral portion of the membrane disc 96 to the housing 52, so as to effectively couple the outer peripheral portion of the membrane disc 96 to the select stator bar 20'. That is, the outer peripheral portion of the membrane disc 96 comprises a fixed portion that is structurally supported within the housing 52 via the core support 70 and is fixed relative to the housing 52 and to the select stator bar 20'. The spacer member 104 is provided to maintain a desired distance between the membrane spring assembly 90 and the core support 70, although the membrane disc 96 flexes a small amount in the direction of a central axis $C_A$ of the vibration sensor 50 (see FIG. 2) during operation of the generator corresponding to vibrations transmitted to the vibration sensor 50, as will be discussed herein.

As shown in FIGS. 3 and 4, first and second nuts 106, 108 are located between the respective first and second masses 82, 84 and the membrane disc 96. The masses 82, 84 and the nuts 106, 108 effectively trap the membrane disc 96 therebetween and function to couple a moveable (relative to the housing 52), central portion of the membrane disc 96 to the pointer member 80 through the engagement of the nuts 106, 108 to either side of the central portion. The pointer member 80 is effectively coupled to the second portion 58B of the FOC 58 containing the FBG 54 via the coupling of the third portion 58C of the FOC 58 within the bore 80A of the pointer member 80 at the second location $L_2$. Thus, the central portion of the membrane disc 96 is effectively coupled to the second portion 58B of the FOC 58 containing the FBG 54, such that vibratory movement of the select stator bar 20' and corresponding movement of the vibration sensor 50 and the outer peripheral portion of the membrane disc 96 cause displacement of the second portion 58B of the FOC 58 containing the FBG 54. That is, the central portion of the membrane disc 96 and the first and second masses 82, 84 are fixed relative to each other but moveable relative to the housing 52 and form a mass-spring system 110 (see FIG. 2). The mass-spring system 110 is supported to the mass-spring support structure 107, where flexing movement of the central portion of the membrane disc 96 resulting from vibrations transmitted to the housing 52 from the select stator bar 20' causes corresponding expansion and contraction of the second portion 58B of the FOC 58 containing the FBG 54, as will be discussed herein.

The first and second height discs 94, 98, which are located at opposing sides of the membrane disc 96, comprise ring-shaped members defining respective central apertures 94A, 98A (see FIG. 4) therein. The first and second height discs 94, 98 effect a damping of vibratory movement of the central portion of the membrane disc 96 so as to limit the maximum displacement flexure of the membrane disc 96, thereby limiting the amount of expansion/contraction of the second portion 58B of the FOC 58 so as to prevent the FOC 58 from breaking. Specifically, the first height disc 94 limits the maximum displacement flexure of the central portion of the membrane disc 96 by restricting movement of the outer peripheral portion of the membrane disc 96 in a radially inward direction of the sensor 50, i.e., in a direction parallel to the central axis $C_A$ of the sensor 50, to effectively limit the amount of contraction of the second portion 58B of the FOC 58. Similarly, the second height disc 98 limits the maximum displacement flexure of the central portion of the membrane disc 96 by restricting movement of the outer peripheral portion of the membrane disc 96 in a radially outward direction to effectively limit the amount of expansion of the second portion 58B of the FOC 58. It is noted that sizes of the apertures 94A, 98A in the height discs 94, 98 can be modified to control the amount of damping of vibratory movement of the central portion of the membrane disc 96 that is provided by the height discs 94, 98.

The first and second membrane stoppers 92, 100 also limit the maximum displacement flexure of the membrane disc 96, thereby limiting the amount of expansion/contraction of the second portion 58B of the FOC 58 so as to prevent the FOC 58 from breaking. Specifically, the first membrane stopper 92 acts as a physical stop for contacting the central portion of the membrane disc 96 to restrict movement of the central portion of the membrane disc 96 in a radially inward direction to effectively limit the amount of contraction of the second portion 58B of the FOC 58. Similarly, the second membrane stopper 100 acts as a physical stop for contacting the central portion of the membrane disc 96 to restrict movement of the central portion of the membrane disc 96 in a radially outward direction to effectively limit the amount of expansion of the second portion 58B of the FOC 58.

It is noted that sizes of apertures 92A, 100A (see FIG. 4) in the membrane stoppers 92, 100, and/or the thicknesses of height discs 94, 98, can be modified to control the limitation of vibratory movement of the central portion of the membrane disc 96 that is provided by the membrane stoppers 92, 100. It is also noted that, while the outer peripheral portion of the membrane disc 96 is fixed relative to the housing 52 and the central portion of the membrane disc 96 is movable relative to the housing 52, the sensor 50 could be configured such that the outer peripheral portion of the membrane disc 96 is movable relative to the housing 52 and the central portion of the membrane disc 96 is fixed relative to the housing 52. That is, the first and second height discs 94, 98 could trap the central portion of the membrane disc 96 therebetween while allowing the outer peripheral portion to flex radially. In such a configuration, the outer peripheral portion of the membrane disc 96, or a least a portion thereof, could be structurally coupled, either directly or indirectly, to the second portion 58B of the FOC 58.

Further, while the sizes of the apertures 92A, 100A in the membrane stoppers 92, 100 are fixed in the embodiment shown, the sizes of the apertures 92A, 100A could be variable, such that the sizes thereof could be manually or automatically adjusted during operation of the generator to change the maximum displacement flexure of the membrane disc 96. This could be accomplished in a manner similar to how a diaphragm mechanism operates in a camera, as will be apparent to those skilled in the art.

In the preferred embodiment, the first and second membrane stoppers 92, 100 are separate components from the height discs 94, 98. However, it is noted that the height discs 94, 98 may be formed integrally with the respective membrane stoppers 92, 100, i.e., as stepped components.

During operation of the generator, vibrations or vibratory movement of the select stator bar 20' result in corresponding vibratory movement of the sensor housing 52 via the attachment of the sensor housing 52 to the end portion 20A of the stator bar 20'. The vibratory movements of the sensor housing 52 are transferred to the mass-spring support structure 107 via the coupling of the core support 70 to the lower section 52A of the sensor housing 52. Since the outer peripheral portion of the membrane disc 96 is affixed to the mass-spring support structure 107, the vibratory movement of the housing 52 is transmitted to the outer peripheral portion of the membrane disc 96. At the central portion of the membrane disc 96, inertias of the masses 82, 84 effectively resist movement of the central portion of the membrane disc 96 and cause the membrane disc 96 to flex in response to the vibratory movement transmitted to the fixed, outer peripheral portion of the membrane disc 96. Thus, the membrane disc 96 may vibrate at a frequency corresponding to the driving frequency(ies) of the select stator bar 20'.

Since the third portion 58C of the FOC 58 is coupled to the central portion of the membrane disc 96 through the pointer member 80, i.e., at the second location $L_2$, and the first portion 58A of the FOC 58 is coupled to the support structure 70 through the anchor member 66, i.e., at the first location $L_1$, displacement of the central portion of the membrane disc 96, i.e., caused by the vibrations transmitted to the membrane disc 96 by the mass-spring support structure 107, results in a corresponding expansion and contraction of the second portion 58B of the FOC 58 at a frequency(ies) corresponding to the frequency(ies) of vibration in the select stator bar 20'. It is noted that the FOC 58 is preferably attached to the anchor member 66 and the pointer member 80 in a pre-stretched condition. Thus, vibratory movement transmitted to the membrane disc 96 results in a further expansion or a contraction of the FOC 58. It is further noted that this expansion and contraction of the FOC 58 is very small, i.e., on the order of micrometers. On a macroscopic scale the movement of the membrane disc 96 and the corresponding movement the FOC 58 is almost imperceptible, but the resulting expansion and contraction of the FBG 54 causes a detectable change in the wavelength λ reflected by the FBG 54. The variation of the reflected wavelength λ is a direct measurement of the magnitude of expansion and contraction of the FOC 58, which is directly related to a displacement of the membrane disc 96 caused by vibratory movement of the housing 52. In this way, the flexing movement of the membrane disc 96 may be measured and may be used to determine a displacement associated with vibrations of the end portion 20A of the select stator bar 20'.

Data in the form of reflected wavelengths λ produced at the FBG 54 may be transmitted back through the FOC 58 via the coupler 60 to the processor 62. The processor 62 may process the data, i.e., variations in wavelength λ, on a time dependent basis to determine an acceleration associated with the data. Further, the processor 62 may determine a frequency of vibration based on the variation of the wavelength with time. In particular, in addition to the data received by the processor 62 corresponding to the displacement and/or acceleration of the sensor 50 on the select stator bar 20', the processor 62 may process the data to identify frequencies of interest, including magnitudes of displacement and/or acceleration at the frequencies of interest. One such frequency of interest corresponds to the natural frequency of the mass-spring system 110 formed by the membrane disc 96 and the masses 82, 84.

In conventional accelerometer sensor designs, it is desirable to design the mass-spring system such that the natural frequency of the mass-spring system is substantially different from the frequencies of the vibrations in the system being monitored by the sensor. In particular, in conventional sensor designs it is common to design the natural frequency of the sensor to be substantially higher than the frequencies of the system to be measured. Providing a substantial difference between the natural frequency of the sensor and the frequencies at which data is collected on the system being monitored makes it unlikely that distortion associated with natural frequency inputs from the sensor will interfere as noise in the collected data.

In accordance with an aspect of the present invention, the natural frequency of the mass-spring system 110 of the sensor 50 is designed to be relatively close to the driving frequencies of the system to be monitored. In particular, the system is designed to have a higher sensitivity, which results in a lowering of the natural frequency of the mass-spring system 110 of the sensor 50. For example, for a generator in which the majority of monitored frequencies may comprise harmonic frequencies that are typically less than about 250 Hz, the design of the sensor 50 may comprise a natural frequency of greater than about 400 Hz, e.g., about 410 Hz. However, it is noted that the design of the vibration sensor 50 can be altered such that its natural frequency is tailored for use in other types of systems having other frequencies to be monitored. For example, the weight of the first and second masses 82, 84 and/or the size of the central apertures 94A, 98A of the height discs 94, 98 can be altered to effectively change the natural frequency of the vibration sensor 50. Further, the sensitivity of the sensor 50 can be further tuned by changing the thickness, diameter, and/or rigidity of the membrane disc 96.

The sensor data output from the vibration sensor 50, which comprises data representative of the vibrations in the system, i.e., corresponding to vibratory displacement produced at the select stator bar 20', and data representative of a natural frequency of the vibration sensor 50, is conveyed by the FOC 58 through the coupler 60 to the processor 62. This data is monitored by the processor 62 in real time. The sensor data, which corresponds to a change of displacement of the membrane disc 96, is used to obtain amplitude (displacement) measurements to obtain the vibration of the sensor 50, as well as to obtain the natural frequency of the sensor 50.

Figure 5:
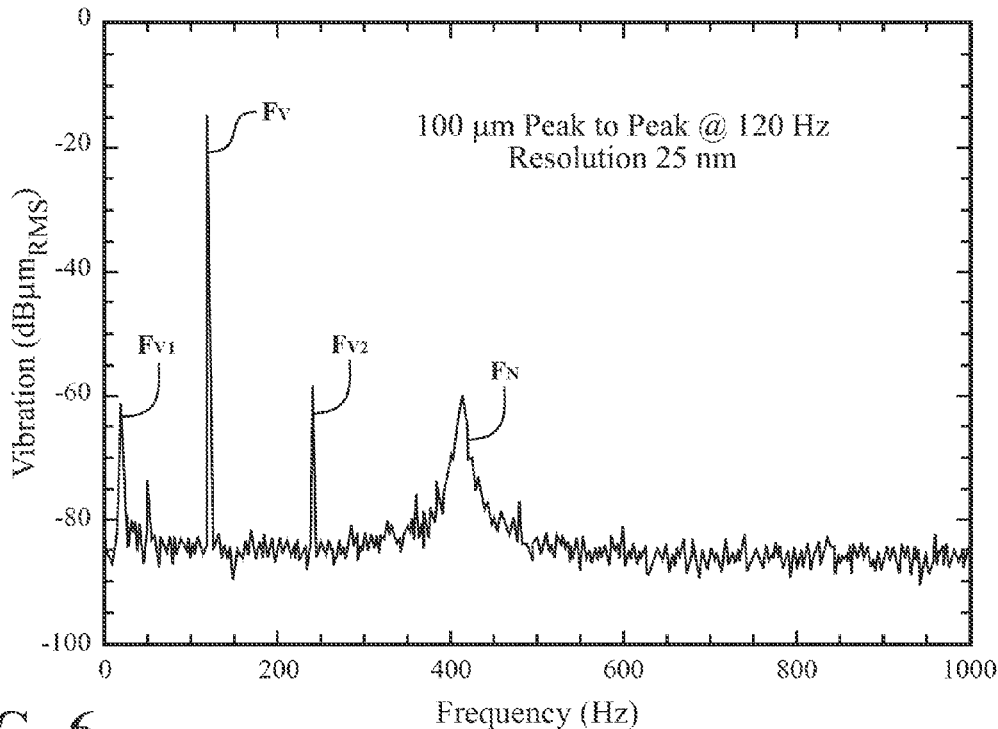
FIGS. 5-9 are graphs illustrating exemplary outputs of a vibration sensor according to an embodiment of the invention during operation of an electric generator.

A graph illustrating a typical output spectrum of the frequencies of the vibration sensor 50 under normal operating conditions after the sensor data undergoes a Fast Fourier Transform (FFT) is shown in FIG. 5. The vibrations of the select stator bar 20', as measured at the membrane disc 96, are depicted in the graph by the reference characters $F_V$. $F_{V1}$ and $F_{V2}$ are harmonics of the vibrations $F_V$. The natural frequency of the vibration sensor 50 is depicted in the graph by the reference characters $F_N$. It is noted that the natural frequency of the vibration sensor 50 is independent of the vibrations occurring within the generator. That is, a deviation in the natural frequency $F_N$ of the sensor 50 typically will not affect or cause an apparent deviation in the measured vibrations $F_V$ of the select stator bar 20', and vice versa. As noted above, the majority of the vibrations sensed by the vibration sensor 50 comprise harmonic frequencies that are less than the natural frequency of the vibration sensor, i.e., in the specific example described above, the majority of the vibrations sensed by the vibration sensor 50 comprise harmonic frequencies that are less than 250 Hz, while the natural frequency of the exemplary vibration sensor may be about 410 Hz.

The processor 62 monitors the sensor data to look for vibrations that could result in damage to the generator components. If the monitored vibrations $F_V$ are determined to be outside of a desired amplitude or frequency range, at least one system operating parameter may be changed to alter the vibrations occurring in the generator. For example, the load of the generator may be reduced, or the temperature of a gas or water for cooling the generator may be altered.

Figure 6:
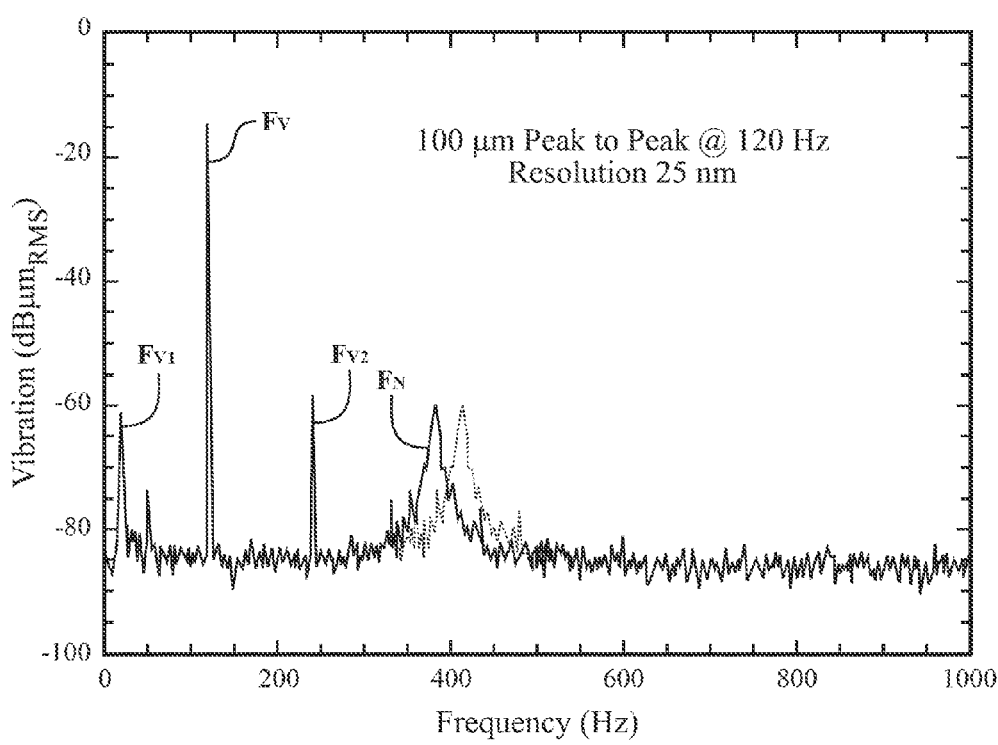
Figure 7:
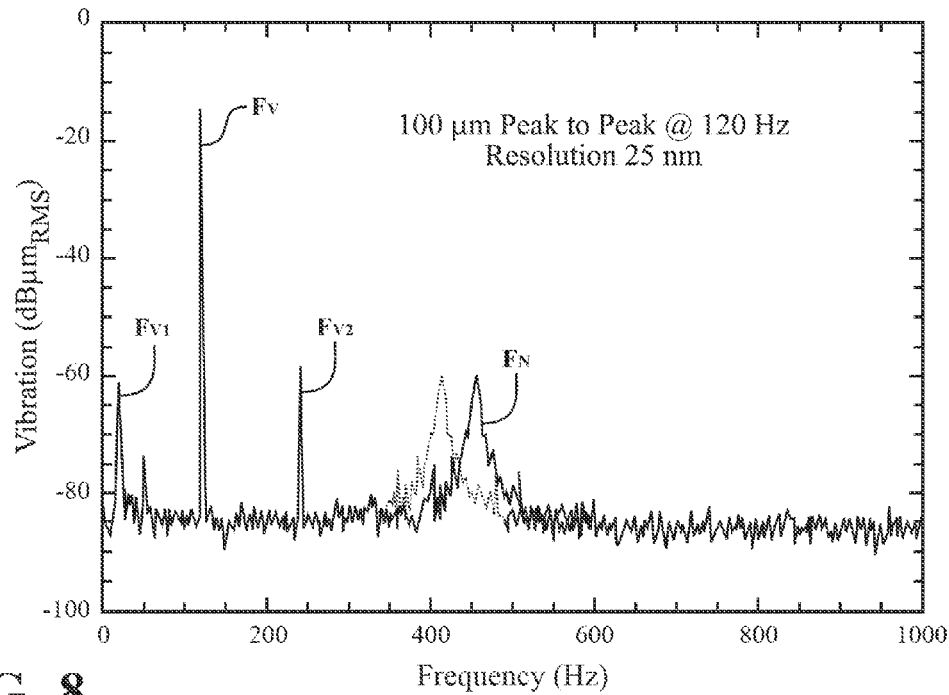
Figure 8:
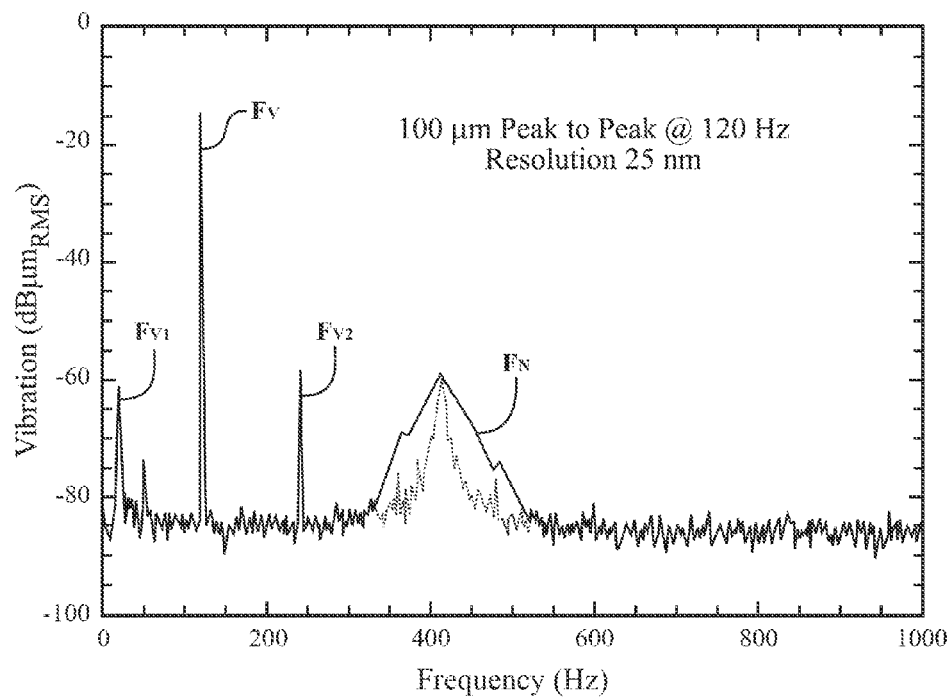
Figure 9:
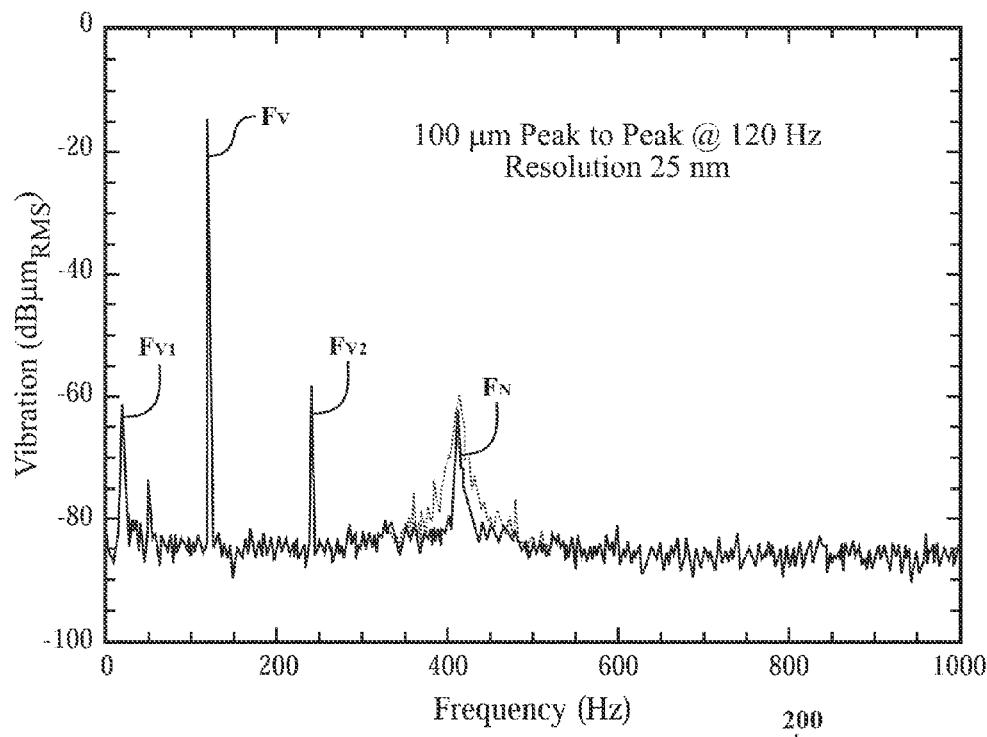

The processor 62 also looks for a change in the data representative of the natural frequency $F_N$ of the vibration sensor 50, as such a change may indicate structural damage, e.g., a crack, in the vibration sensor 50. That is, according to the present embodiment, the peak of the natural frequency envelope of the vibration sensor 50 is about 410 Hz. If this value deviates from 410 Hz by a predetermined amount, such as, for example, at least about 5 Hz, the vibration sensor 50 may have structural damage and may be in need of being repaired or replaced. Hence, if the peak of the natural frequency of the vibration sensor 50 deviates from 410 Hz by at least about 5 Hz, i.e., is decreased, as shown in FIG. 6, or increased, as shown in FIG. 7, the vibration sensor 50 may be flagged for repair/replacement. Other factors may also be used to trigger the flagging of the vibration sensor 50, such as if the frequency envelope of the natural frequency of the vibration sensor 50 is expanded or contracted, as depicted in FIGS. 8 and 9, respectively. It is noted that the dotted lines in FIGS. 6-9 represent the frequency envelope of the vibration sensor 50 under normal operating conditions as depicted in FIG. 5, and are presented in FIGS. 6-9 to illustrate the deviations of the frequency of the vibration sensor 50 in these graphs.

If the vibration sensor 50 is flagged, it may be removed from the select stator bar 20' and may be serviced, e.g., repaired or replaced. A new vibration sensor (or the repaired vibration sensor 50) may then be placed on the select stator bar 20'.

Since the condition of the vibration sensor 50 is monitored along with the vibrations of the select stator bar 20', any damage to the vibration sensor 50 can be detected at an early stage and can be performed without a physical inspection of the vibration sensor 50. Further, since the data representative of the natural frequency $F_N$ of the vibration sensor 50 is inherently transmitted through the FOC 58 along with the data representative of the vibrations $F_V$ of the select stator bar 20', dedicated instruments are not required to monitor the condition of the vibration sensor 50.

Figure 10:
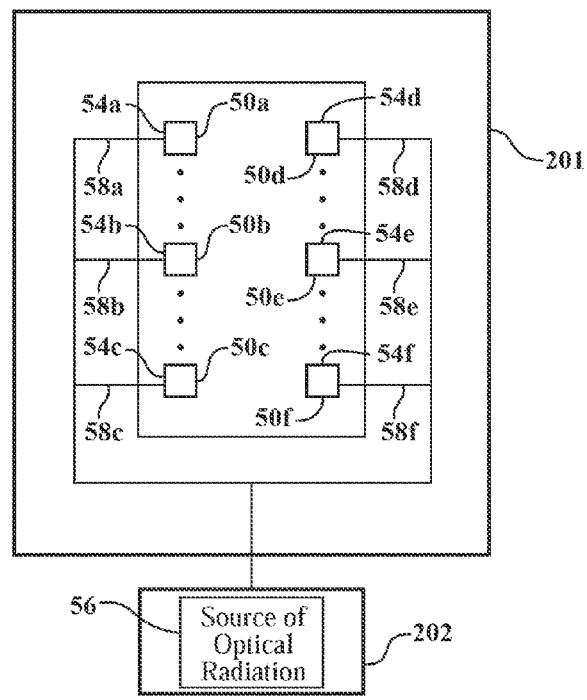
FIG. 10 is a schematic diagram of a sensor system including a plurality of vibration sensors according to an embodiment of the invention.

Referring to FIG. 10, a system 200 for monitoring the operating condition of an electric generator 201 is illustrated. The system 200 includes at least one vibration sensor, such as the vibration sensor 50 described above, and preferably comprises a plurality of vibration sensors 50a-f, each vibration sensor 50a-f coupled to a corresponding stator bar as described above.

Each vibration sensor 50a-f in the system 200 is in communication with and sends sensor data, including data representative of the vibrations received by the corresponding vibration sensor 50a-f and data representative of a natural frequency of the corresponding vibration sensor 50a-f as described above, to a processor 202, e.g., a plant data acquisition system. Further, each vibration sensor 50a-f in the system 200 has a unique FBG 54a-f having a unique central Bragg wavelength $\lambda_0$ corresponding to the particular sensor 50a-f. A source of optical radiation 56, such as a broadband light source, is coupled to a plurality of FOCs 58a-f extending to the vibration sensors 50a-f for providing the vibration sensors 50a-f with optical radiation. The broadband light source provides light in a range that corresponds to the reflected wavelength represented by the FBGs 54a-f of the sensors 50a-f. The processor 202 may identify the source of the data received from the sensors 50a-f by the unique wavelength range reflected from each of the FBGs 54a-f of the sensors 50a-f.

The processor 202 acquires the sensor data corresponding to each of the vibration sensors 50a-f. If the monitored sensor data indicates that vibrations are occurring that are outside of a predetermined range, one or more operating conditions of the generator 201 may be changed to alter the vibrations occurring therein. Further, if the monitored sensor data indicates that the natural frequency of any of the vibrations sensors 50a-f deviates from its normal frequency, e.g., is decreased or increased, or if the frequency envelope is expanded or contracted, that vibration sensor 50 may be flagged for repair/replacement, as described above.

Figure 11:
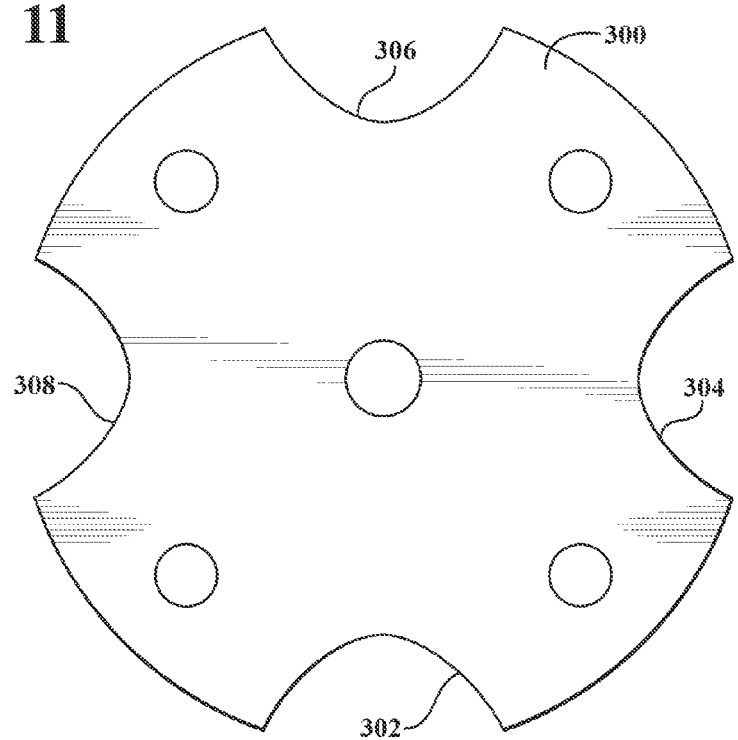
FIGS. 11 and 12 are perspective views of alternate configurations of a membrane disc for use in a vibration sensor in accordance with the present invention.
Figure 12:
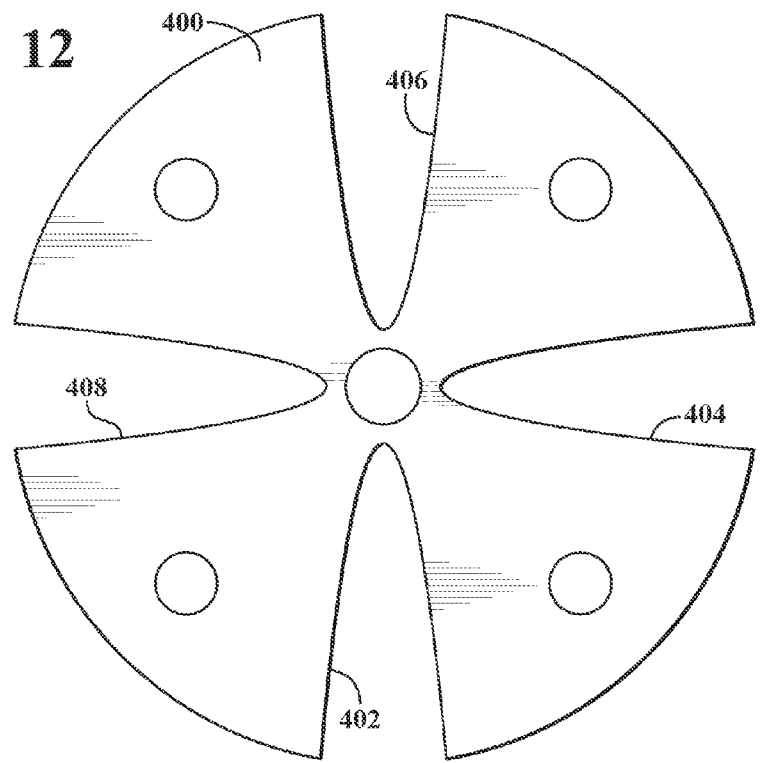

Referring to FIGS. 11 and 12, membrane discs 300, 400 for vibration sensors according to other embodiments of the invention are illustrated. The membrane disc 300 illustrated in FIG. 11 comprises a generally round shape having concave rounded or contoured portions 302, 304, 306, 308 removed or otherwise missing from the outer edge thereof, i.e., the portions 302, 304, 306, 308 extend radially inwardly from the outer edge thereof, and the membrane disc 400 illustrated in FIG. 12 comprises a generally round shape having larger concave hyperbolic-shaped portions 402, 404, 406, 408 removed or otherwise missing from the outer edge thereof i.e., the portions 402, 404, 406, 408 extend radially inwardly from the outer edge thereof. By removing the portions 302-308, and 402-408, the membrane discs 300, 400 become easier to flex, which translates to a lowering of the natural frequency of the membrane discs 300, 400. Also, since the membrane discs 300, 400 are easier to deflect, a smaller amplitude change in the vibration of a stator bar to which the respective vibration sensors are affixed will result in an easier flexure of the membrane disc 300, 400, providing a higher sensitivity to the sensor. Additionally, in the embodiment of FIG. 12, it is believed that the hyperbolic shape that defines the portions 402-408 of material removed from the membrane disc 400 enable tuning of the membrane disc 400 to conform to desired design criteria. Furthermore, the hyperbolic shape of the removed portions 402-408 provides very low structural stress on the membrane disc 400, thus reducing the possibility of crack formations in the disc 400.

While the monitoring of sensor data described herein has been described in terms of using the vibration sensor 50, the systems and methods of the present invention may be implemented with any sensor that provides an output that includes data representative of the natural frequency of the sensor. Further, while the conditions within an electric generator are described as being monitored herein, other types of systems can be monitored using the systems and methods described herein, i.e., the systems and methods described herein are not intended to be limited to monitoring the conditions within an electric generator.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A sensor comprising:
   a housing adapted to be secured to a component within a system to be monitored by the sensor;
   an optical fiber secured within said housing at a first location that is fixed relative to said housing and at a second location that is movable relative to said housing such that a sensing portion of said optical fiber between said first and second locations is able to undergo expansion and contraction resulting from movement of said optical fiber at said second location relative to said first location, said sensing portion of said optical fiber containing a fiber Bragg grating;
   a membrane spring assembly located in said housing, said membrane spring assembly comprising:
      a membrane disc having a fixed portion that is fixed relative to said housing and a central portion that is movable relative to said housing, said central portion is fixed relative to said optical fiber at said second location such that movement of said central portion causes corresponding displacement of said optical fiber at said second location to cause expansion and contraction of said sensing portion of said optical fiber containing said fiber Bragg grating; and
      a pointer member affixed to said optical fiber at said second location and coupled to said central portion of said membrane disc to effectively couple said optical fiber to said membrane disc;
   wherein the expansion and contraction of said sensing portion of said optical fiber effects a change in a light wavelength reflected by said fiber Bragg grating, wherein the light wavelength reflected by said fiber Bragg grating can be used to measure movement of said central portion of said membrane disc.

2. The sensor according to claim 1, wherein said optical fiber is secured within said housing at said first and second locations in a pre-stretched condition.

3. The sensor according to claim 1, wherein said membrane spring assembly further comprises first and second height discs located on opposing sides of said membrane disc, said first and second height discs limiting a maximum displacement flexure of said membrane disc.

4. The sensor of claim 3, wherein said height discs are adapted to contact an outer peripheral portion of said membrane disc to effect a damping of vibratory movement of said central portion of said membrane disc, thus limiting an amount of expansion and contraction of said sensing portion of said optical fiber.

5. The sensor according to claim 1, wherein said membrane spring assembly further comprises first and second membrane stoppers located on opposing sides of said membrane disc, said membrane stoppers limiting a maximum displacement flexure of said membrane disc.

6. The sensor of claim 5, wherein said membrane stoppers are adapted to contact said central portion of said membrane disc to limit vibratory movement of said central portion, thus limiting an amount of expansion and contraction of said sensing portion of said optical fiber.

7. The sensor of claim 1, wherein said membrane disc forms part of a mass-spring system, said mass-spring system further comprising first and second masses located on opposing sides of said membrane disc, wherein inertias of said masses effectively resist movement of said central portion of said membrane disc and cause said membrane disc to flex in response to movement of said fixed portion of said membrane disc.

8. The sensor of claim 1, further comprising a core support coupled to said housing, said core support effectively providing structural support for said fixed portion of said membrane disc and for said optical fiber at said first location.

9. The sensor of claim 1, wherein said membrane disc comprises a generally circular shape having concave contoured portions extending radially inwardly from an outer edge thereof.

10. A sensor system comprising:
    a sensor comprising:
       a housing adapted to be secured to a component within a system to be monitored by the sensor system;
       a membrane spring assembly located in said housing, said membrane spring assembly comprising:
          a membrane disc having a fixed portion that is fixed relative to said housing and a movable portion that is movable relative to said housing; and
          first and second height discs located on opposing sides of said membrane disc, said first and second height discs limiting a maximum displacement flexure of said movable portion of said membrane disc;
       an optical fiber located within said housing, said optical fiber comprising:
          a first portion that is fixed relative to said housing;
          a second portion containing a fiber Bragg grating; and
          a third portion that is fixed relative to said movable portion of said membrane disc, wherein said second portion of said optical fiber is located between said first and third portions thereof such that said second portion containing said fiber Bragg grating is able to undergo expansion and contraction resulting from movement of said movable portion of said membrane disc relative to said housing;
    wherein the expansion and contraction of said second portion of said optical fiber effects a change in a light wavelength reflected by said fiber Bragg grating, wherein the light wavelength reflected by said fiber Bragg grating can be used to measure movement of said movable portion of said membrane disc.

11. The sensor system of claim 10, wherein:
    said fixed portion of said membrane disc comprises an outer peripheral portion;
    said movable portion of said membrane disc comprises a central portion; and
    said height discs are in contact with said outer peripheral portion of said membrane disc to effect a damping of vibratory movement of said central portion of said membrane disc, thus limiting an amount of expansion and contraction of said second portion of said optical fiber containing said fiber Bragg grating.

12. The sensor system of claim 11, wherein said height discs comprise ring-shaped members defining central apertures therein, wherein sizes of said apertures control the amount of damping of vibratory movement of said central portion of said membrane disc that is provided by said height discs.

13. The sensor system of claim 10, further comprising:
a light source supplying light to an end of said optical fiber; and
an analyzer to analyze the light reflected by said fiber Bragg grating.

14. The sensor system of claim 13, further comprising a plurality of said sensors, each said sensor receiving light from said light source and having a unique fiber Bragg grating in said optical fiber second portion thereof, wherein said analyzer analyzes light reflected by said fiber Bragg grating for each sensor in the sensor system.

15. A sensor system comprising:
a sensor comprising:
a housing adapted to be secured to a component within a system to be monitored by the sensor system;
a membrane spring assembly located in said housing, said membrane spring assembly comprising:
a membrane disc having a fixed portion comprising an outer peripheral portion that is fixed relative to said housing and a movable portion comprising a central portion that is movable relative to said housing; and
first and second membrane stoppers located on opposing sides of said membrane disc, said first and second membrane stoppers limiting a maximum displacement flexure of said movable portion of said membrane disc;
an optical fiber located within said housing, said optical fiber comprising:
a first portion that is fixed relative to said housing;
a second portion containing a fiber Bragg grating; and
a third portion that is fixed relative to said movable portion of said membrane disc, wherein said second portion of said optical fiber is located between said first and third portions thereof such that said second portion containing said fiber Bragg grating is able to undergo expansion and contraction resulting from movement of said movable portion of said membrane disc relative to said housing;
wherein the expansion and contraction of said second portion of said optical fiber effects a change in a light wavelength reflected by said fiber Bragg grating, wherein the light wavelength reflected by said fiber Bragg grating can be used to measure movement of said movable portion of said membrane disc.

16. The sensor system of claim 15, wherein said membrane stoppers comprise ring-shaped members defining respective central apertures therein, wherein sizes of said apertures control the maximum displacement flexure of said movable portion of said membrane disc that is provided by said membrane stoppers.

17. The sensor system of claim 15, wherein said membrane spring assembly further comprising first and second height discs located between said membrane disc and said respective membrane stoppers, said first and second height discs limiting a maximum displacement flexure of said movable portion of said membrane disc.

18. The sensor system of claim 17, wherein said membrane stoppers and said height discs each comprise ring-shaped members defining respective central apertures therein, wherein the maximum displacement flexure of said movable portion of said membrane disc can be controlled by at least one of:
sizes of the central apertures in said membrane stoppers;
sizes of the central apertures in said height discs; and
thicknesses of said height discs.

19. A sensor comprising:
a housing adapted to be secured to a component within a system to be monitored by the sensor;
an optical fiber secured within said housing at a first location that is fixed relative to said housing and at a second location that is movable relative to said housing such that a sensing portion of said optical fiber between said first and second locations is able to undergo expansion and contraction resulting from movement of said optical fiber at said second location relative to said first location, said sensing portion of said optical fiber containing a fiber Bragg grating;
a membrane spring assembly located in said housing, said membrane spring assembly comprising:
a membrane disc having a fixed portion that is fixed relative to said housing and a central portion that is movable relative to said housing, said central portion is fixed relative to said optical fiber at said second location such that movement of said central portion causes corresponding displacement of said optical fiber at said second location to cause expansion and contraction of said sensing portion of said optical fiber containing said fiber Bragg grating; and
a core support coupled to said housing, said core support effectively providing structural support for said fixed portion of said membrane disc and for said optical fiber at said first location;
wherein the expansion and contraction of said sensing portion of said optical fiber effects a change in a light wavelength reflected by said fiber Bragg grating, wherein the light wavelength reflected by said fiber Bragg grating can be used to measure movement of said central portion of said membrane disc.

20. The sensor of claim 19, further comprising a spacer member located between said core support and said membrane spring assembly, said spacer member maintaining a desired distance between said core support and said membrane spring assembly.

21. A sensor comprising:
a housing adapted to be secured to a component within a system to be monitored by the sensor;
an optical fiber secured within said housing at a first location that is fixed relative to said housing and at a second location that is movable relative to said housing such that a sensing portion of said optical fiber between said first and second locations is able to undergo expansion and contraction resulting from movement of said optical fiber at said second location relative to said first location, said sensing portion of said optical fiber containing a fiber Bragg grating;
a membrane spring assembly located in said housing, said membrane spring assembly comprising:
a membrane disc comprising a generally circular shape having concave contoured portions extending radially inwardly from an outer edge thereof and having a fixed portion that is fixed relative to said housing and a central portion that is movable relative to said housing, said central portion is fixed relative to said optical fiber at said second location such that movement of said central portion causes corresponding displacement of said optical fiber at said second location to cause expansion and contraction of said sensing portion of said optical fiber containing said fiber Bragg grating;

wherein the expansion and contraction of said sensing portion of said optical fiber effects a change in a light wavelength reflected by said fiber Bragg grating, wherein the light wavelength reflected by said fiber Bragg grating can be used to measure movement of said central portion of said membrane disc.

* * * * *